May 19, 1959 R. E. BECKER 2,887,123
AIR PRESSURE REGULATING UNIT
Filed Sept. 17, 1956

Inventor
Robert E. Becker
by Parker & Carter
Attorneys

United States Patent Office 2,887,123
Patented May 19, 1959

2,887,123

AIR PRESSURE REGULATING UNIT

Robert E. Becker, Logansport, Ind., assignor to Logansport Machine Co., Inc., Logansport, Ind., a corporation of Indiana Application September 17, 1956, Serial No. 610,194

10 Claims. (Cl. 137—505.11)

My invention relates to improvements in pressure regulator units and has for one object to provide a pressure regulator which may be easily and conveniently manually adjusted to regulate and control air or gas pressure in any suitable pneumatic control unit.

Another object of my invention is to provide a regulator wherein the pressure setting may be exactly ascertained without the necessity of momentarily exhausting pressure from any part of the unit.

Other objects will appear from time to time throughout the course of the specification and claims.

Figure 2:
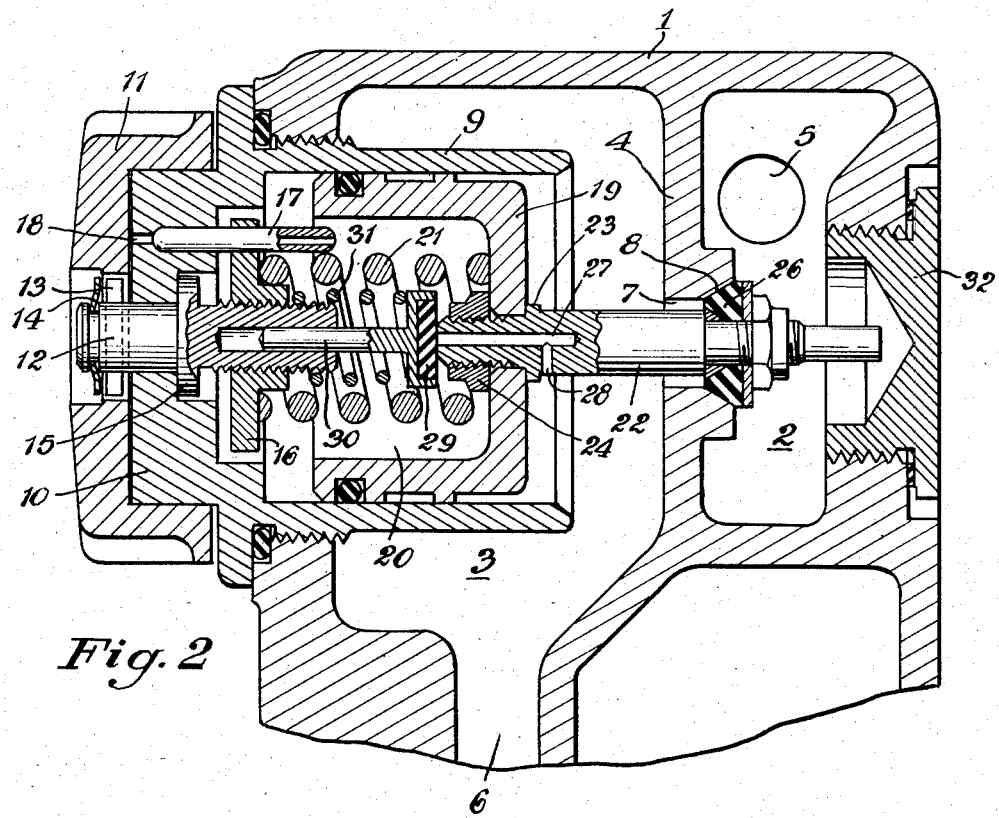
Figure 1:
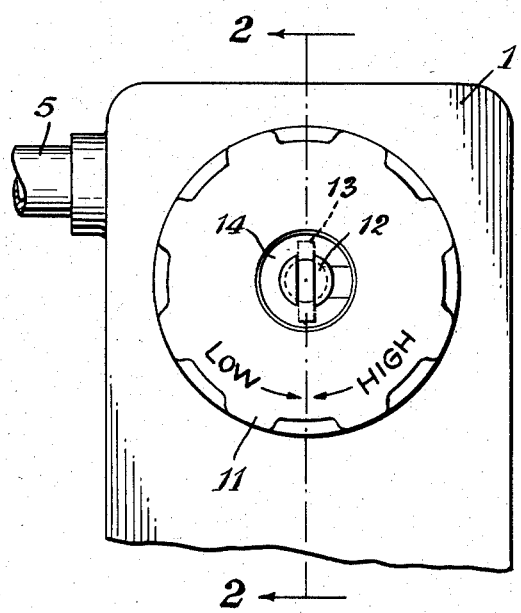

My invention is illustrated more or less diagrammatically in the accompanying drawings, wherein Figure 1 is an elevation on a reduced scale of the unit;

Figure 2 is a section on an enlarged scale along the line 2—2 of Figure 1.

Like parts are indicated by like characters throughout the specification and drawings.

1 is a regulator housing. It contains a high pressure chamber 2, a low pressure chamber 3 separated by a partition wall 4. 5 is a high pressure inlet communicating with the high pressure chamber 2. 6 is a low pressure outlet communicating with the low pressure chamber 3 to supply gas under regulated pressure to any desired point. Means for supplying gas or air under pressure through the port 5 form no part of the present invention and are not here illustrated. An air duct 7 in the partition wall 4 is interposed between chambers 2 and 3 and is surrounded by a valve seat 8.

9 is a control cylinder threaded in one wall of the housing 1 concentric with the valve seat 8 and open toward the chamber 3 but closed at its outer end by a boss 10 on which is rotatably mounted the adjusting knob 11. 12 is an adjusting stem rotatable in the boss 10 extending therethrough and adapted to be rotated when the knob 11 is rotated by means of the pin 13 interlocking with the knob, parts being held together by the spring washer 14. The adjusting stem 12 is flanged at 15 and threaded as indicated in the spring plate 16. The spring plate is held against rotation by the hollow pin 17 socketed in the boss 10 and in register with the discharge duct 18 which discharges into the clearance between the boss 10 and the knob 11.

19 is a piston slidable in the cylinder 9 and defining with the cylinder a relief chamber 20. 21 is a relatively strong coarse adjustment spring encircling the adjusting stem 12 and interposed between the spring plate 16 and the closed end of the piston 19. 22 is a valve stem held in and closing the apertured end of the piston 19, being flanged at 23 and threaded to receive a nut 24. The valve stem 22 carries the valve 26 adapted to seat on the valve seat 8. The valve stem 22 is centrally apertured at 27 in communication through the duct 28 with the low pressure chamber 3. The end of the valve stem 22 defines a seat for the valve 29 on valve stem 30. A fine adjustment spring 31 of less strength but greater accuracy than the spring 21 is interposed between the flanged end of the valve stem 30 and the spring plate and may hold the valve 29 against its seat to close the passage 27.

A removable plug 32 threaded in the wall of the housing 1 opposite to the cylinder merely closes the chamber 2 and provides access to the valve 26.

The use and operation of my invention are as follows:

High pressure being admitted to the chamber 2 holds the valve 26 on its seat when the adjusting knob is in the closed position. Movement of the knob in a clockwise direction, Fig. 1, permits increase of pressure in the chamber 3 and movement of the knob in a counterclockwise direction to the end of its excursion permits the valve 26 to seat.

If the knob is then moved in a clockwise direction, the adjusting stem 12 rotates with respect to the spring plate 16 and since the pin 17 prevents rotation of the spring plate, the plate is moved toward the right in Figure 1 applying a pressure to the spring 21 to cause the valve 8 to unseat. This permits gas to flow through the duct 7 from the high pressure chamber to the low pressure chamber 3 to build up a pressure in that chamber. At the same time, the plate 16 also increases pressure on the spring 31 to cause the poppet relief valve 29 to follow and remain seated on the end of the apertured valve stem 22, closing the duct 27. When the pressure in the chamber 3 rises sufficiently, it tends to force the piston 19 to the left in Fig. 2 tending to move the valve 26 toward its seat to reduce flow from 2 to 3 through duct 7. Thus flow of high pressure air into the pressure chamber 3 is adjusted in proportion to the pressure of the springs 21 and 31 as adjusted by the setting of the control knob.

Under these conditions, pressure in chamber 3 is stable and the parts are in equilibrium. Should there be an increase in pressure in chamber 3 due to resistance to discharge or to other forces being imposed on the air in the chamber, such increase will force the poppet relief piston 29 away from its seat against the sensitive spring 31 thus opening passage for flow of air through passages 28, 27, in stem 22, chamber 20, tube 17, duct 18 to outside through the clearance under the regulating knob, thus bringing the unit back to stable position.

The fine spring 31 is more sensitive and of more accurate construction than the coarse heavy spring 21 and so responds in its operation to the rotation of the regulating knob 11 more quickly than does the spring 21, thus permitting the poppet valve 29 to be raised from its seat immediately when the knob is turned to a low pressure setting. This in turn is reflected on any pressure gauge that may be connected to the chamber 3 so that such gauge will immediately indicate lowering of pressure in chamber 3. Thus the pressure gauge needle may track with raising or lowering of pressure in the chamber 3 as the knob 11 is rotated toward high or low position. That being the case, since pressure in chamber 3 is immediately responsive to the positioning of the control valve, it is never necessary to drain or exhaust air from chamber 3 as a prerequisite to ascertaining the particular pressure setting resulting from the position of the knob.

I claim:

1. An air pressure regulator including a housing having high and low pressure chambers, a passage between them, a cylinder open at one end to the low pressure chamber, a regulating valve in the passage, biased to closing position by the pressure in the high pressure chamber, a piston slidable in the cylinder, exposed to the low pressure, a stem joining the piston and the valve, the piston defining with the cylinder a relief chamber open to atmosphere, a relief passage through the stem open at one end to the low pressure chamber and at the other end to the relief chamber, a relief valve for the relief passage in the relief chamber, a regulating spring within the relief chamber biasing the piston and the regulating valve to open position, a sensitive quick acting spring within the relief chamber biasing the relief valve to closed position, a single means for simultaneously adjusting the tension of said springs in unison.

2. An air pressure regulator including a housing having high and low pressure chambers, a passage between them, a cylinder open at one end to the low pressure chamber, a regulating valve in the passage, biased to closing position by the pressure in the high pressure chamber, a piston slidable in the cylinder, exposed to the low pressure, a stem joining the piston and the valve, the piston defining with the cylinder a relief chamber open to atmosphere, a relief passage through the stem open at one end to the low pressure chamber and at the other end to the relief chamber, a relief valve for the relief passage in the relief chamber, a regulating spring within the relief chamber biasing the piston and the regulating valve to open position, a sensitive quick acting spring within the relief chamber biasing the relief valve to closed position, a single means for simultaneously adjusting the tension of said springs in unison, the spring adjusting means including a spring plate and means for holding it against rotation, a rotatably mounted screw in threaded relation with the plate and means for rotating said screw, both springs abutting on the plate, the regulating spring abutting at its other end on the piston, the quick acting spring abutting at its other end on the relief valve.

3. An air pressure regulator including a housing having high and low pressure chambers, a passage between them, a cylinder open at one end to the low pressure chamber, a regulating valve in the passage, biased to closing position by the pressure in the high pressure chamber, a piston slidable in the cylinder, exposed to the low pressure, a stem joining the piston and the valve, the piston defining with the cylinder a relief chamber open to atmosphere, a relief passage through the stem open at one end to the low pressure chamber and at the other end to the relief chamber, a relief valve for the relief passage in the relief chamber, a regulating spring within the relief chamber biasing the piston and the regulating valve to open position, a sensitive quick acting spring within the relief chamber biasing the relief valve to closed position, a single means for simultaneously adjusting the tension of said springs in unison, the spring adjusting means including a spring plate and means for holding it against rotation, a rotatably mounted regulating screw in threaded relation with the plate and means for rotating said screw, both springs abutting on the plate, the regulating spring abutting at its other end on the piston, the quick acting spring abutting at its other end on the relief valve, the screw, the valve stem, the piston and the relief valve being all concentric with and in alignment with the regulating valve and mounted for removal as a unit from the low pressure chamber.

4. An air pressure regulator including a housing having high and low pressure chambers, a passage between them, a cylinder open at one end to the low pressure chamber, a regulating valve in the passage, biased to closing position by the pressure in the high pressure chamber, a piston slidable in the cylinder, exposed to the low pressure, a stem joining the piston and the valve, the piston defining with the cylinder a relief chamber open to atmosphere, a relief passage through the stem open at one end to the low pressure chamber and at the other end to the relief chamber, a relief valve for the relief passage in the relief chamber, a regulating spring within the relief chamber biasing the piston and the regulating valve to open position, a sensitive quick acting spring within the relief chamber biasing the relief valve to closed position, a single means for simultaneously adjusting the tension of said springs in unison, the spring adjusting means including a spring plate and means for holding it against rotation, a rotatably mounted regulating screw in threaded relation with the plate and means for rotating said screw, both springs abutting on the plate, the regulating spring abutting at its other end on the piston, the quick acting spring abutting at its other end on the relief valve, the cylinder being closed at its outer end by a boss in which the regulating screw is mounted, a hollow pin socketed in the boss extending through and holding the spring plate against rotation, open at one end to the relief chamber and at the other end to atmosphere.

5. An air pressure regulator including a housing having high and low pressure chambers, a passage between them, a regulating valve therefor, a piston movable therewith, a cylinder, the valve being biased by pressure in the high pressure chamber and the piston by pressure in the low pressure chamber toward closing position, there being a pressure relief passage through the piston from the low pressure chamber to atmosphere, a pressure relief valve adapted to close said passage against pressure in the low pressure chamber, a regulating spring urging the regulating valve toward open position, a sensitive quick acting spring urging the pressure relief valve toward closed position, a single means for simultaneously varying the tension of said springs.

6. In a pressure regulator including high and low pressure chambers and a passage between them, a regulating valve in the passage, a cylinder and a piston, a valve stem joining piston and valve for simultaneous movement, the pressure in both chambers biasing the regulating valve and piston toward valve closing position, there being a relief passage extending longitudinally of the valve stem open at one end to the low pressure chamber and at the other to atmosphere, a relief valve adapted to close the relief passage, an adjusting spring adapted to urge piston and regulating valve toward open position, a quick acting spring adapted to urge the relief valve in the same direction toward closed position and a single means for simultaneously adjusting the tension of said springs.

7. In a pressure regulator including high and low pressure chambers and a passage between them, a regulating valve in the passage, a cylinder and a piston, a valve stem joining piston and valve for simultaneous movement, the pressure in both chambers biasing the regulating valve and piston toward valve closing position, there being a relief passage extending longitudinally of the valve stem open at one end to the low pressure chamber and at the other to atmosphere, a relief valve adapted to close the relief passage, an adjusting spring adapted to urge the piston and regulating valve toward open position, a quick acting spring adapted to urge the relief valve in the same direction toward closed position and a single means for simultaneously adjusting the tension of said springs, said means including a rotatable threaded adjusting stem adapted to be manually rotated, a spring abutment plate held against rotation in threaded relationship with the adjusting stem, both springs abutting thereon whereby movement of the abutment plate in response to rotation of the adjusting stem increases the pressure of the spring to unseat the regulating valve, the relief valve being free to unseat responsive to increase in pressure in the low pressure chamber independent of movement of the regulating valve.

8. Pressure regulating means including a housing enclosing a pressure chamber and having an apertured internally threaded outer wall, a cylinder threaded in said aperture closed at one end and open at the other to the chamber, a threaded adjusting stem mounted for rotation in the closed end of the cylinder, said stem being concentric with and held against longitudinal displacement with respect to the closed end of and extending toward but terminating short of the open end of the cylinder, an adjusting plate in threaded relation with said stem, means for holding the plate against rotation while leaving it free to move axially of the stem, a piston slidable in the cylinder and defining with it a relief chamber, there being a duct through the piston open at one end to the pressure chamber and at the other end to the relief chamber, a relief valve in the relief chamber adapted to control the duct, separate springs abutting the adjusting plate, one spring contacting at its other end the piston, the other contacting at its other end the relief valve whereby rotation of the stem simultaneously and equally varies the tension of the springs, the cylinder and associated parts being removable as a unit from the housing.

9. Pressure regulating means including a housing enclosing a low pressure chamber and having an apertured internally threaded outer wall, a cylinder threaded in said aperture closed at one end and open at the other to the chamber, a threaded adjusting stem mounted for rotation in the closed end of the cylinder, said stem being concentric with and held against longitudinal displacement with respect to the closed end of and extending toward but terminating short of the open end of the cylinder, an adjusting plate in threaded relation with said stem, means for holding the plate against rotation while leaving it free to move axially of the stem, a piston slidable in the cylinder and defining with it a relief chamber, there being a duct through the piston open at one end to the pressure chamber and at the other end to the relief chamber, a relief valve in the relief chamber adapted to control the duct, separate springs abutting the adjusting plate, one spring contacting at its other end the piston, the other contacting at its other end the relief valve whereby rotation of the stem simultaneously and equally varies the tension of the springs, the cylinder and associated parts being removable as a unit from the housing, there being a high pressure chamber in the housing, a passage in alignment with the cylinder joining the high and low pressure chambers, a valve stem carried by the piston extending through said passage, a valve carried by the valve stem in the low pressure chamber, the valve being separately removable from the valve stem, the wall of the low pressure chamber being apertured in register with the passage, a removable closure therefor through which access to the valve may be had.

10. The structure of claim 5 further characterized by and including a valve stem joining the regulating valve and piston so that they move in unison, the pressure relief passage being in the valve stem.

References Cited in the file of this patent
UNITED STATES PATENTS

| | | |
|---|---|---|
| 714,143 | Carlson | Nov. 25, 1902 |
| 948,469 | Moyle | Feb. 8, 1910 |
| 2,581,429 | Meyer | Jan. 8, 1952 |
| 2,700,983 | Bryant | Feb. 1, 1955 |